United States Patent [19]

Handa

[11] Patent Number: 5,644,450

[45] Date of Patent: Jul. 1, 1997

[54] MAGNETIC HEAD ASSEMBLY WITH THIN-FILM MAGNETIC HEAD AND FLEXIBLE SUPPORT MEMBER

[75] Inventor: Yoichi Handa, Kawasaki, Japan

[73] Assignee: Fujitsu Limited, Kawasaki, Japan

[21] Appl. No.: 602,685

[22] Filed: Feb. 16, 1996

Related U.S. Application Data

[63] Continuation of Ser. No. 145,063, Oct. 28, 1993, abandoned.

[30] Foreign Application Priority Data

Oct. 30, 1992 [JP] Japan ..................... 4-292984
Oct. 30, 1992 [JP] Japan ..................... 4-292985

[51] Int. Cl.$^6$ ..................... G11B 5/48; G11B 21/16
[52] U.S. Cl. ..................... 360/104
[58] Field of Search ..................... 360/103, 104, 360/105; 29/603

[56] References Cited

U.S. PATENT DOCUMENTS 4,429,337 1/1984 de Wilde ..................... 360/123
4,546,541 10/1985 Reid ..................... 29/603
4,761,699 8/1988 Ainslie et al. ..................... 360/104
5,001,583 3/1991 Matsuzaki ..................... 360/104
5,041,932 8/1991 Hamilton ..................... 360/104

*Primary Examiner*—Stuart S. Levy
*Assistant Examiner*—George J. Letscher
*Attorney, Agent, or Firm*—Greer, Burns & Crain, Ltd.

[57] ABSTRACT

A thin-film magnetic head assembly having a thin-film magnetic head and an elongated flexible support member. The magnetic head includes a base portion, a core, a coil arranged helically around the core, and a pole adapted to contact a recording medium. The magnetic head has bonding pads for connecting the coil to conductors on the flexible support member, each of the bonding pads having a flat conductor portion arranged on the top surface of the base portion and a stud-like conductor portion connected the coil. The support member includes bumps on the bottom surface thereof. The magnetic head is attached to the support member with the bumps in abutment with the bonding pads, and an adhesive is filled in a gap between the facing surfaces of the magnetic head and the support member.

23 Claims, 23 Drawing Sheets

MAGNETIC HEAD ASSEMBLY WITH THIN-FILM MAGNETIC HEAD AND FLEXIBLE SUPPORT MEMBER

RELATED APPLICATION

This is a continuation of application Ser. No. 08/145,063, filed on Oct. 28, 1993 now abandoned.

BACKGROUND OF THE INVENTION

1. Field of the Invention

The present invention relates to a contact-type magnetic head used in a magnetic disk apparatus for storing and reproducing data, and in particular, the present invention relates to a single-pole, contact-type thin-film magnetic head for perpendicular reading and writing.

2. Description of the Related Art

Recently, increasing demands have been made for magnetic disk apparatuses which satisfy the requirements of compact size, thinness, low price, and low energy consumption. To satisfy these demands, contact-type thin-film magnetic heads have been developed. Contact-type magnetic heads are intended to normally contact the magnetic disk with a sliding engagement. Contact-type magnetic heads can be fabricated by the use of thin-film forming techniques so that they are very small and very light.

U.S. Pat. No. 5,041,932, for example, discloses such a small thin-film magnetic head. In this prior art, a plurality of thin-film magnetic heads are fabricated on a planar substrate such as a silicon wafer. Each of the magnetic heads has a base structure, a coil, and a pole magnetically coupled with the coil for reading and writing data on the magnetic recording medium. The coil is helically formed around a core, the coil and the core being formed within the base structure. The pole is formed on the side surface of the base structure and connected to the core. A return yoke is also arranged in the base structure near the bottom surface thereof to receive the magnetic flux emitting from the pole.

In addition, a contact pad is arranged on the bottom surface of the base structure for sliding engagement with the magnetic disk, the pole extending from the side surface of the base structure to the side surface of the contact pad. The base structure is long compared to the length of the actual magnetic head, including the coil and the pole, so that the elongated base portion serves as a flexible support member for mounting the magnetic head onto an actuator of the magnetic disk apparatus. In use, the contact pad is urged against the magnetic disk by a weak spring force from the elongated base portion (flexible support member portion).

In this type of magnetic heads, it is preferable that the flexible support member portion has a spring modulus ranging from 100 to 500 mg/mm. To provide this spring modulus, a typical entire magnetic head has approximately the following dimensions.

L = 5–12 mm
W = 300–600 μm
t = 30–50 μm where, L is the length of the entire base portion, W is the width of the base portion, and t is the thickness of the base portion.

In the fabrication of the thin-film magnetic head, a plurality of magnetic heads are simultaneously fabricated on one substrate such as a silicon wafer. If a substrate having a diameter of 3 inches is used, it is possible to lay out 280 magnetic heads (70 rows×4 columns) on the substrate. However, it is desired to obtain more magnetic heads from one substrate to realize a cost reduction, since the larger the number of magnetic heads obtained from one substrate, the lower the fabrication cost per magnetic head. It is, therefore, proposed to separately fabricate the actual magnetic head portion (hereinafter called the magnetic head) and the flexible support member portion (hereinafter called the flexible support member), and subsequently to couple these members together so that the size of the magnetic heads can be reduced and the number of the magnetic heads obtained from one substrate can be increased.

SUMMARY OF THE INVENTION

An object of the present invention is to provide a magnetic head assembly comprising a thin-film magnetic head and an elongated flexible support member for supporting the magnetic head.

Another object of the present invention is to provide a magnetic head assembly comprising a magnetic head, an elongated flexible support member, and means for mechanically and electrically connecting the magnetic head to the flexible support member.

According to the present invention, there is provided a magnetic head assembly comprising a thin-film magnetic head and an elongated flexible support member for supporting the magnetic head: (a) the magnetic head including a base portion having a top surface, a coil arranged within the base portion, the coil having first and second ends, a pole magnetically coupled with the core and adapted to contact a recording medium, and conductor means connected to the first and second ends of the coil, the conductor means having a pair of conductor members arranged on the top surface of the base portion; (b) the support member including a bottom surface, conductor means extending substantially along the length of the support member, the conductor means having a pair of conductor members arranged on the bottom surface of the support member; and (c) wherein one pair of the conductor members of the magnetic head and the support member are bumps and the other pair of the conductor members are bonding pads, the magnetic head being attached to the support member, with the top surface of the base portion facing the bottom surface of the support member and the bumps in abutment with the bonding pads, an adhesive being filled in a gap between the facing top and bottom surfaces.

Preferably, each of the bonding pads is arranged in a recess in the top surface of the base portion so that the bonding pads are flush with the top surface of the base portion.

Preferably, each of the bonding pads comprises a flat conductor portion and a stud-like conductor portion integral with the flat conductor portion, the stud-like conductor portion extending within one of the base portion and the support member on which the bonding pads are arranged.

BRIEF DESCRIPTION OF THE DRAWINGS

The present invention will become more apparent from the following description of the preferred embodiments, with reference to the accompanying drawings, in which:

FIGS. 9A to 9I are views illustrating fabrication steps for fabricating the magnetic head of FIGS. 1 to 4;

DESCRIPTION OF THE PREFERRED EMBODIMENTS

Figure 1:
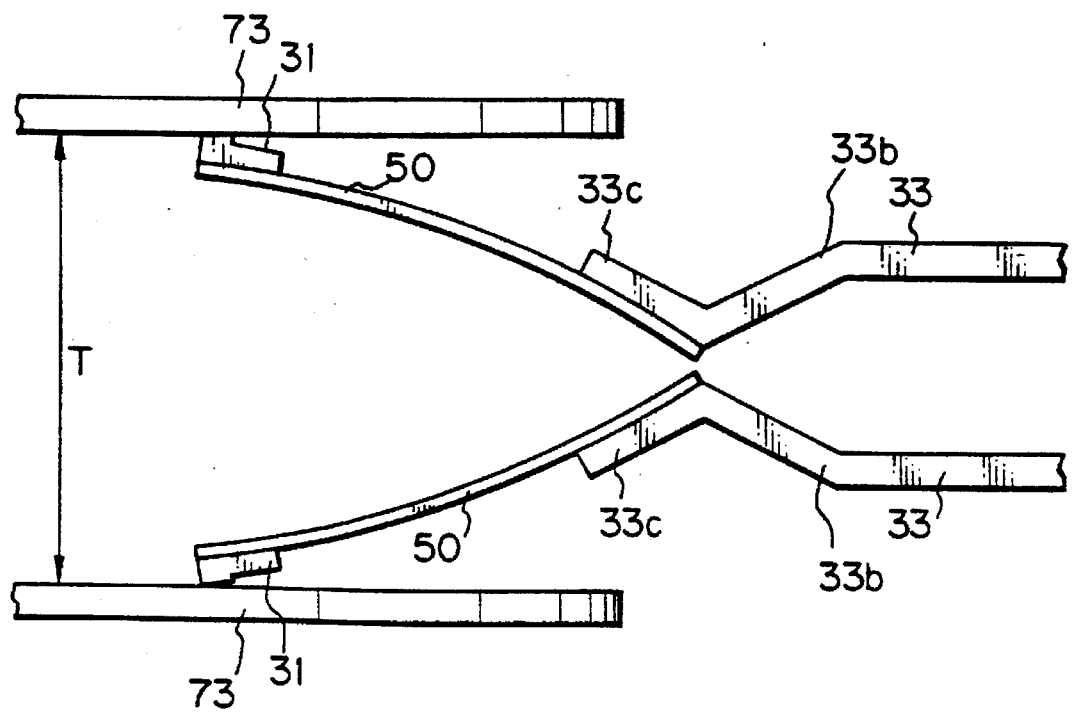
FIG. 1 is a side view of a magnetic head assembly according to the first embodiment of the present invention, with the magnetic head contacting a magnetic disk.

FIG. 1 shows the first embodiment of the present invention. In FIG. 1, two sets of thin-film magnetic heads 31 contact magnetic disks 73. Each magnetic head 31 is attached to one end of a flexible support member 50 the other end of which is carried by an actuator arm 33 of a magnetic disk apparatus. The actuator arm 33 has bent portions 33b and 33c and the magnetic head 31 is attached to the portion 33c so that the flexible support member 50 can provide a predetermined elastic force to urge the magnetic head 31 into contact with the magnetic disk 73. That is, the distance T between two magnetic disks 73 is smaller than the distance between two magnetic heads 31 when they are not inserted between the magnetic disks 73.

Figure 7:
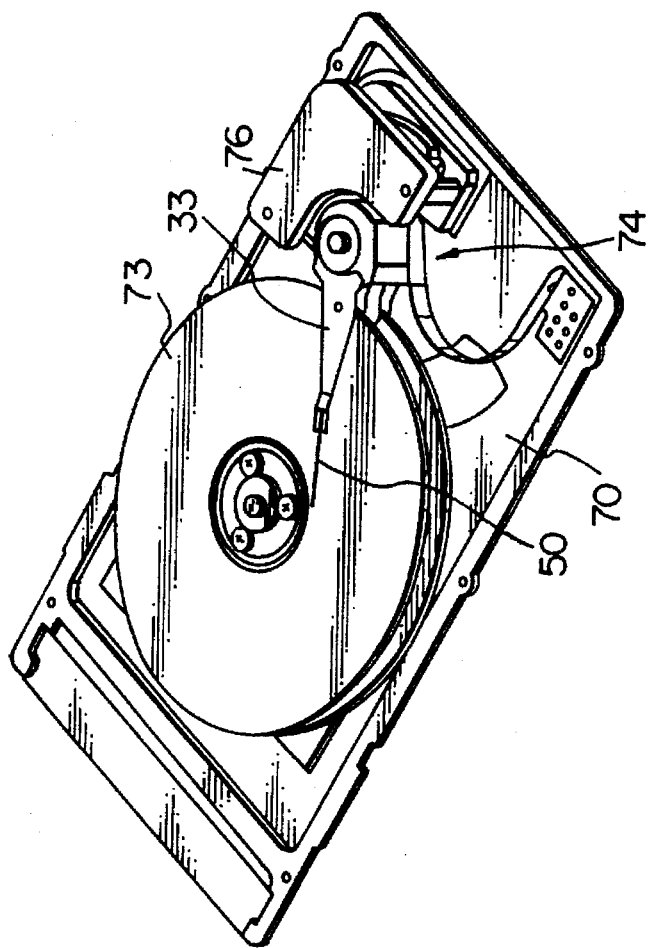
FIG. 7 is a perspective view of the magnetic disk apparatus in which the magnetic disk assembly of the present invention is used.
Figure 8:
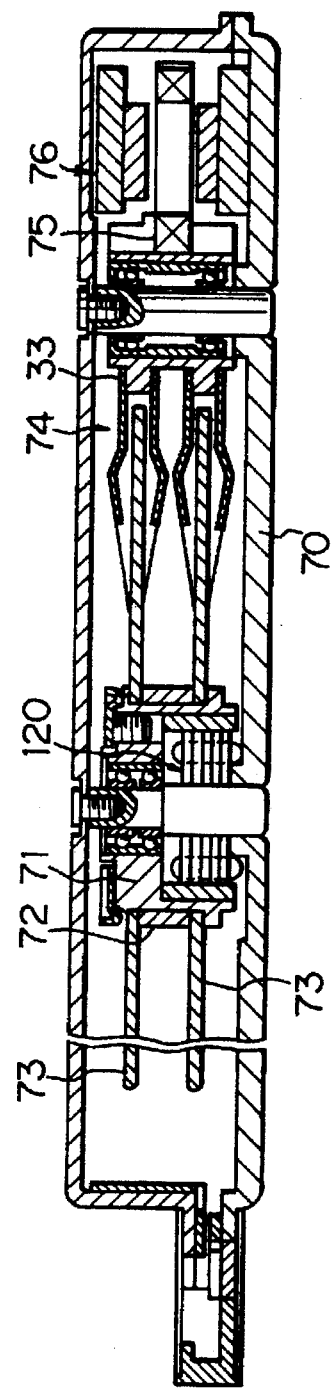
FIG. 8 is a cross-sectional view of the magnetic disk apparatus of FIG. 7.

FIGS. 7 and 8 show the magnetic disk apparatus having the actuator arms 33 of FIG. 1. As is well known, a spindle 71 is arranged on a base 70 of the apparatus and driven by an inner hub motor 120 at a high rotational speed (for example, 3600 rpm). A plurality of (two in the embodiment) magnetic disks 73 are supported by the spindle 71 and spaced from each other by a spacer 72. Also, a head actuator 74 having the actuator arms 33 is arranged on the base 70. The head actuator 74 has a coil 75 attached thereto, which is inserted in a gap of a magnetic circuit element 75 to constitute a moving coil type motor to move the head actuator 74 and thus move the magnetic heads 31 over the magnetic disks 73.

Figure 2:
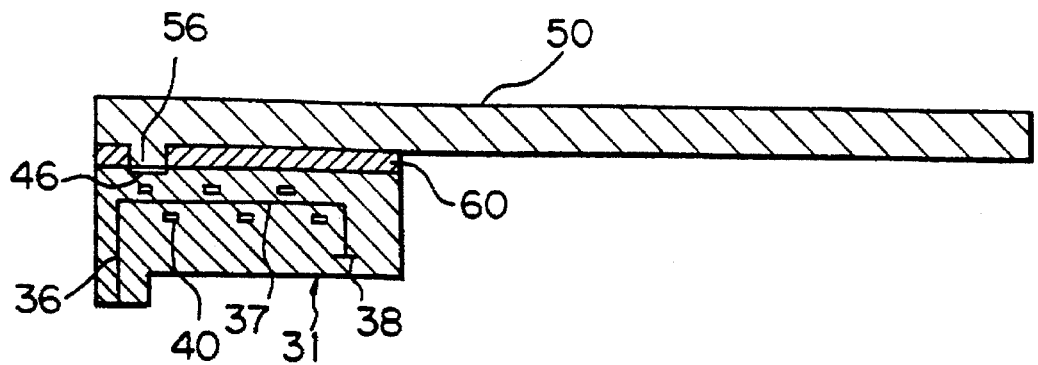
FIG. 2 is a diagrammatic cross-sectional view of the magnetic head assembly of FIG. 1, illustrating the connection between the magnetic head and the flexible support member.

In FIG. 2, the flexible support member 50 includes bumps 56 (one is shown in FIG. 2) on the bottom surface thereof, and the magnetic head 31 includes bonding pads 46 (one is shown in FIG. 2). The magnetic head 31 is attached to the support member 50 with the bumps 56 in abutment with the bonding pads 46, and an adhesive 60 is filled in a gap between the bottom surface of the support member 50 and the top surface of the magnetic head 31.

Figure 3:
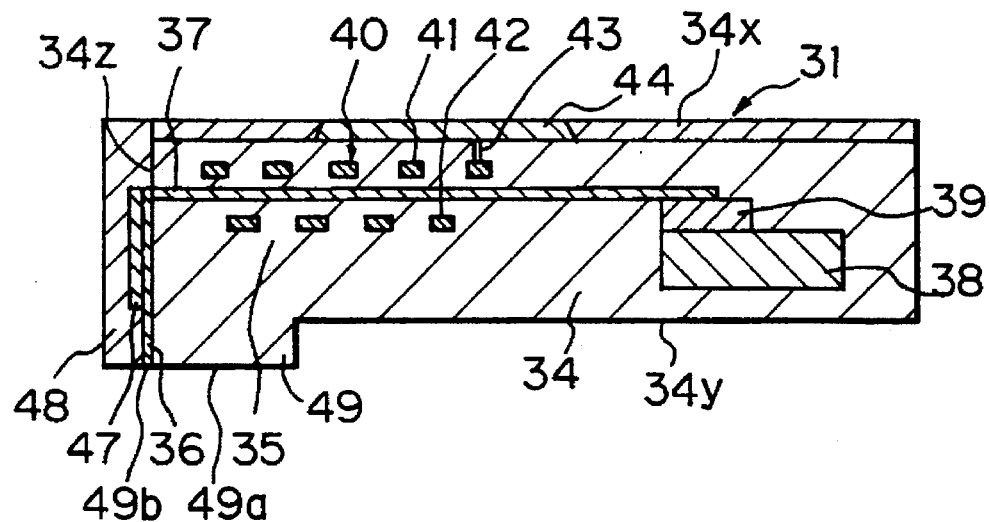
FIG. 3 is a cross-sectional view of the magnetic head of FIG. 1.
Figure 4:
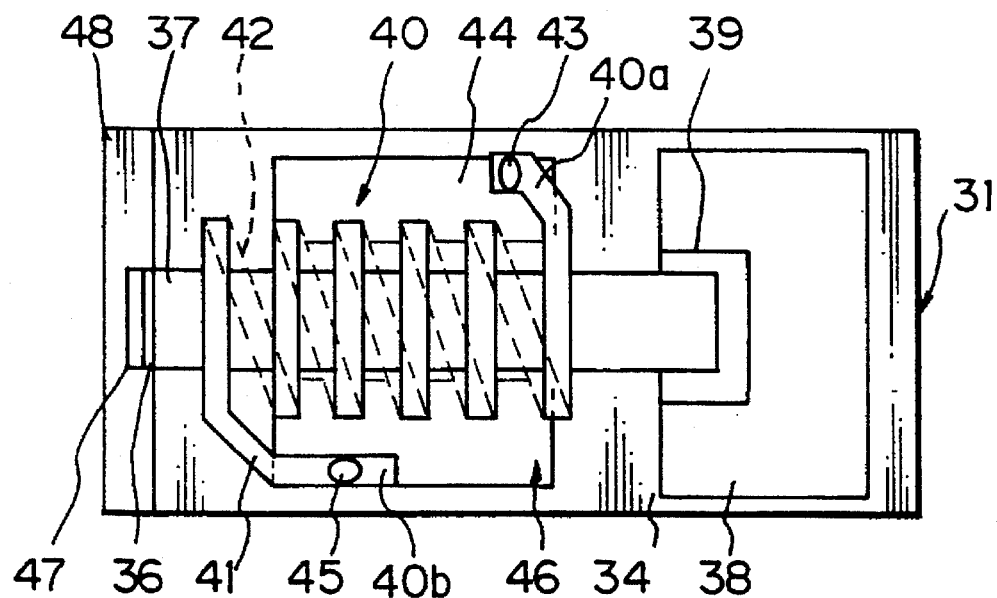
FIG. 4 is a plan view of the magnetic head of FIG. 3.

FIGS. 3 and 4 show the magnetic head 31 in detail. The magnetic head includes a base structure or a base portion 34 having a top surface 34x, bottom surface 34y, and a side surface 34z perpendicular to the top and bottom surfaces 34x and 34y. An electro-magnetic transducer 35 is formed in the base portion 34. A pole 36 of a soft magnetic material such as iron nitride (FeN) is formed on the side surface 34z of the base portion 34 so as to extend to the bottom surface 34b toward the magnetic disk.

A core 37 of a soft magnetic material such as Permalloy is axially arranged within the base portion 34 parallel to the top surface 34a of the base portion 34, and one end of the core 37 is connected to the pole 36. A return yoke 38 and a return stud 39 of a soft magnetic material such as Permalloy are arranged within the base portion 34 so as to extend from the other end of the core 37 toward the bottom surface 34y of the base portion 34. A coil 40 of copper is helically formed around the core 37 within the base portion 34, the coil 40 comprising an upper coil portion 41, a lower coil portion 42, and a portion interconnecting the upper and lower coil portions 41 and 42. Each of the upper and lower coil portions 41 and 42 comprises flat and parallel strips. The coil 40 has a first end 40a and a second end 40b.

A pair of bonding pads 44 and 46 are arranged on the top surface 34x of the base portion 34. In particular, the bonding pads 44 and 46 are arranged in recesses in the top surface 34a of the base portion 34 so that the bonding pads 44 and 46 are flush with the top surface 34x of the base portion 34. Each of the bonding pads 44 and 46 comprises a flat conductor portion and a stud-like conductor portion 43 or 45 integral with the flat conductor portion. The stud-like conductor portion 43 or 45 extends within the base portion 34 and is connected to the end 40a or 40b of the coil 40. A main yoke 47 of Permalloy is arranged on the pole 36 but the main yoke 47 does not cover the lower end portion of the pole 36. A protective layer 48 is formed on the side surface 34c of the base portion 34 to cover the main yoke 47 and the pole 36. In addition, a contact pad 49 is arranged on the bottom surface 34b of the base portion 34. The contact pad 49 has a bottom surface 49a adapted to contact the magnetic disk and a side surface 49b extending flush with the side surface 34z of the base portion 34, and the pole 36 extends from the side surface 34z of the base portion 34 to the side surface 49b of the contact pad 49.

Figure 5:
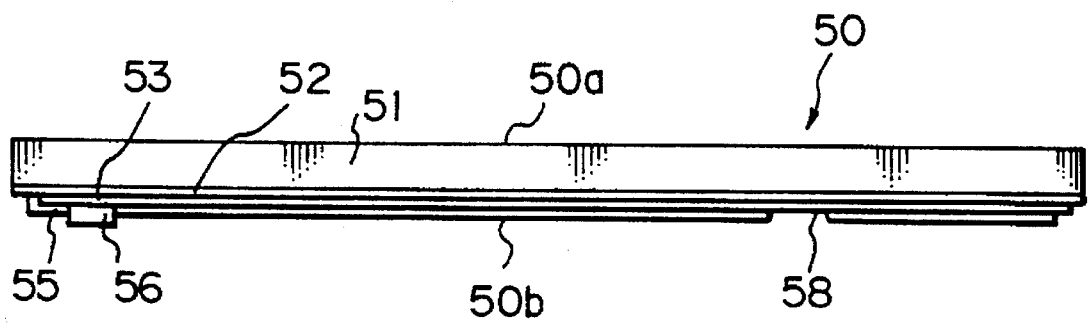
FIG. 5 is a side view of the flexible support member of FIG. 1.
Figure 6:
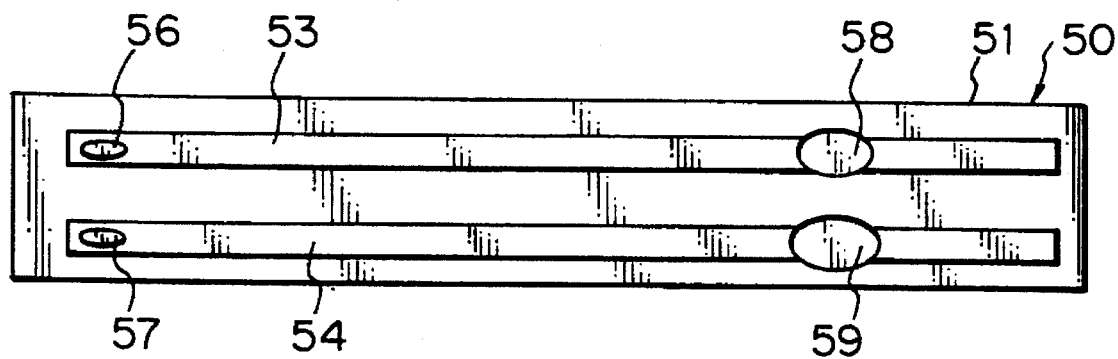
FIG. 6 is a bottom view of the flexible support member of FIG. 5.

FIGS. 5 and 6 show the flexible support member 50 in detail. The support member 50 comprises a base structure or a base portion 51 made from a material having elasticity such as stainless steel or alumina, an insulating layer 52 of polyimide, alumina or resist, a pair of conductor patterns 53 and 54 of copper arranged on the insulating layer 52 along the length of the base portion 51 parallel to each other, and a protection layer 55 to cover the conductor patterns 53 and 54. A pair of bumps 56 and 57 are arranged on one end of the conductor patterns 53 and 54, respectively, for connection to the bonding pads 44 and 46 of the magnetic heads 31, respectively. A pair of bonding pads 58 and 59 are arranged on the other end of the conductor patterns 53 and 54, respectively, for connection to conductors extending from the actuator arm 33 to the support member 50. The surface 50a of the base portion 51 is the top surface of the flexible support member 50 and the surface 50b of the protection layer 55 is the bottom surface of the flexible support member 50.

Figure 9A:
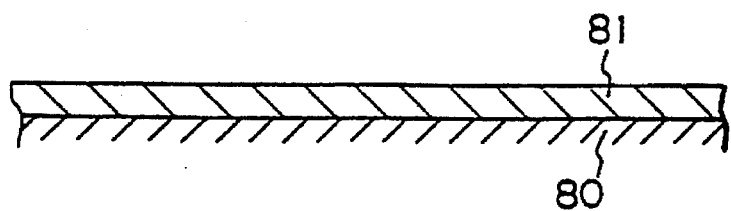
Figure 9B:
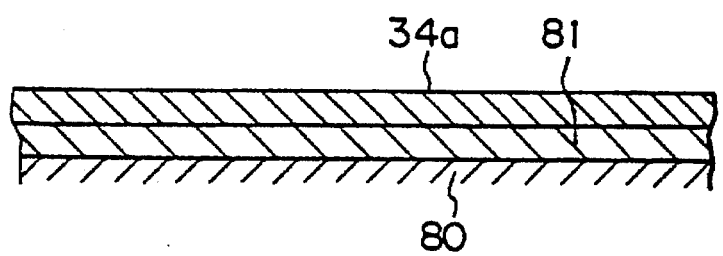
Figure 9C:
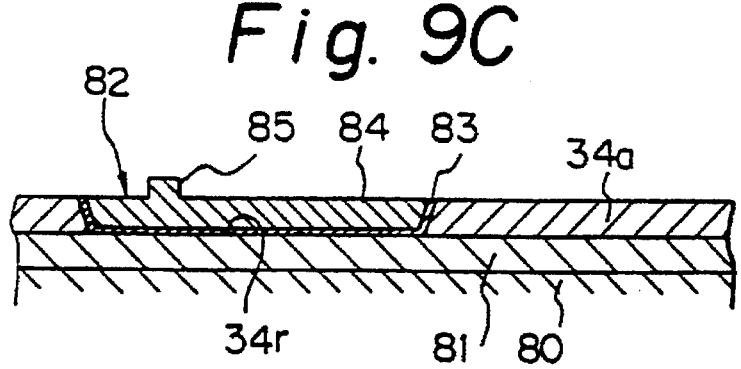

FIGS. 9A to 9I show fabrication steps for fabricating the magnetic head 31. The core 37, the coil 40, and the pole 36 of FIGS. 3 and 4 are formed on a silicon wafer 80 by the use of a thin-film forming technique such as sputtering, plating, CVD or photolithography. A releasing layer 81 of copper is formed on the wafer 80, as shown in FIG. 9A, and a first base portion 34a of Alumina ($Al_2O_3$) is formed on the releasing layer 81, as shown in FIG. 9B. The first base portion 34a corresponds to an upper portion of the base portion 34 of FIGS. 3 and 4. Recesses 34r (only one shown in the drawings) are then formed in the first base portion 34a and bonding pads 82 are formed in the recesses 34r, as shown in FIG. 9C. The bonding pad 82 comprises a bottom layer 83 of gold, a flat layer 84 of copper, and a stud-like projecting portion 85 of copper. It will be understood that the bonding pad 82 corresponds to the bonding pad 44 or 46 of FIGS. 3 and 4. The bottom layer 83 contacts the releasing layer 81 and is flush with the bottom surface of the first base portion 34a.

Figure 9D:
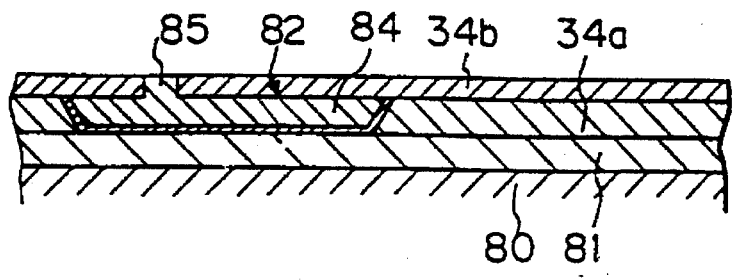
Figure 9E:
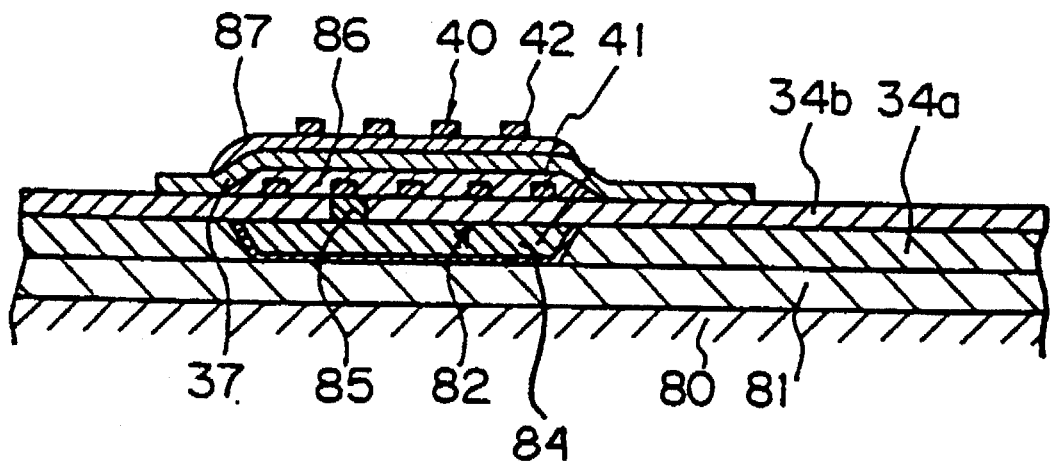

A second base portion 34b is formed on the first base portion 34a and the flat layer 84, so that the stud-like projecting portion 85 is revealed, as shown in FIG. 9D. The coil 40 and the core 37 are then formed, as shown in FIG. 9E. In particular, a first coil portion 41 (corresponding to the upper coil portion 41 of FIGS. 3 and 4) is formed on the second base portion 34b. In this case, an end portion of the upper coil portion 41 contacts the stud-like projecting portion 85 of the bonding pad 82, and another end portion of the upper coil portion contacts the stud-like projecting portion 85 of another bonding pad 82 (not shown). A second insulating layer 86 is formed on the upper coil portion 41 so that the central portions of the parallel strips of the upper coil portion 41 are covered by the second insulating layer 86 but the ends of the parallel strips of the upper coil portion 41 are not covered by the second insulating layer 86. A layer for the core 37 is then formed on the second insulating layer 86 so that both ends of the core 37 extend beyond the second insulating layer 86. A third insulating layer 87 is formed on the core 37 and the second insulating layer 86. The third insulating layer 87 has a similar profile to that of the second insulating layer 86 and the ends of the parallel strips of the upper coil portion 41 can be seen from above of the third insulating layer 87. A second coil portion 42 (corresponding to the lower coil portion 42 of FIGS. 3 and 4) is then formed on the third insulating layer 87 and the ends of the parallel strips of the upper coil portion 41. Accordingly, the coil 40 helically extending around the core 37 is formed.

Figure 9F:
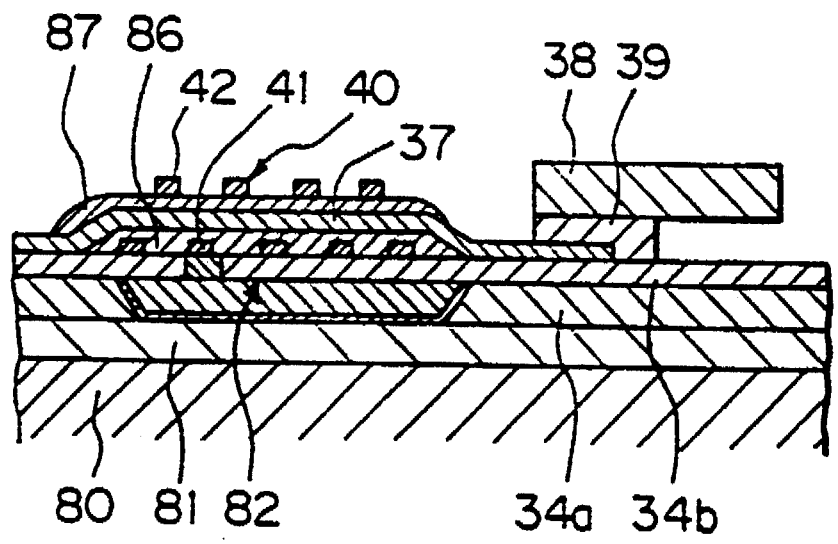
Figure 9G:
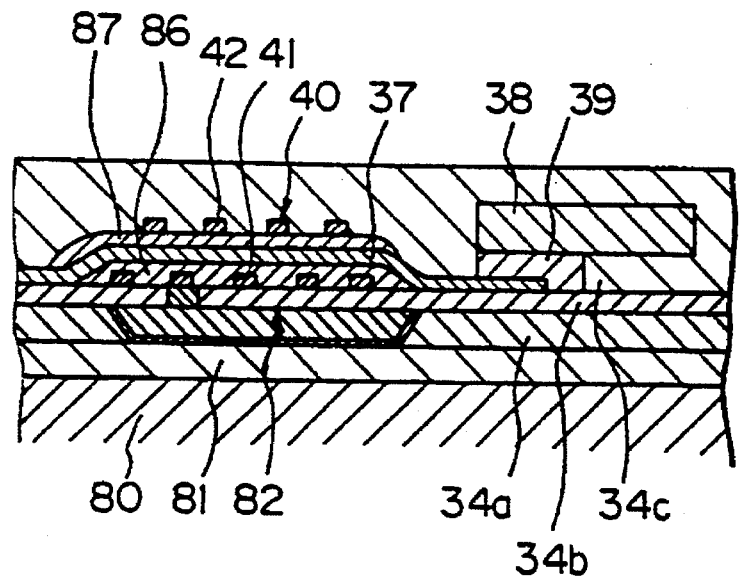
Figure 9H:
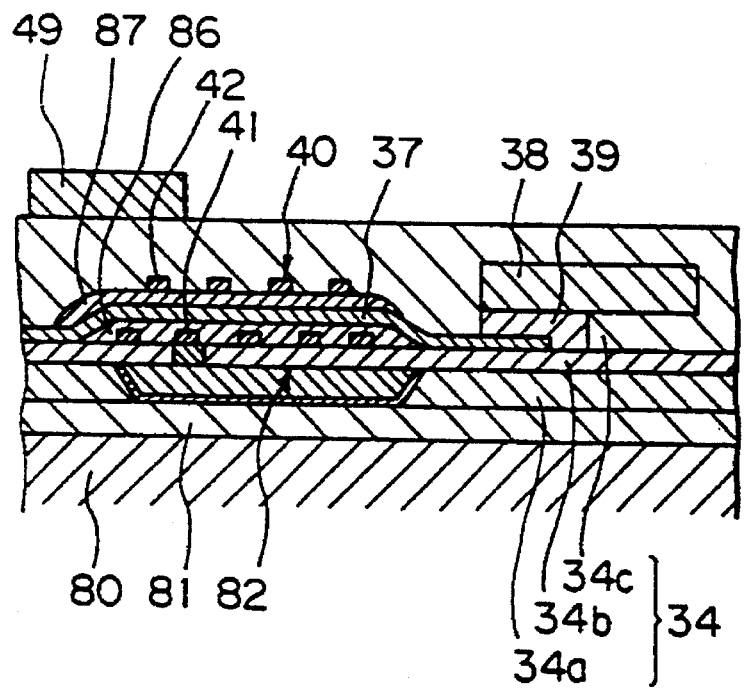
Figure 91:
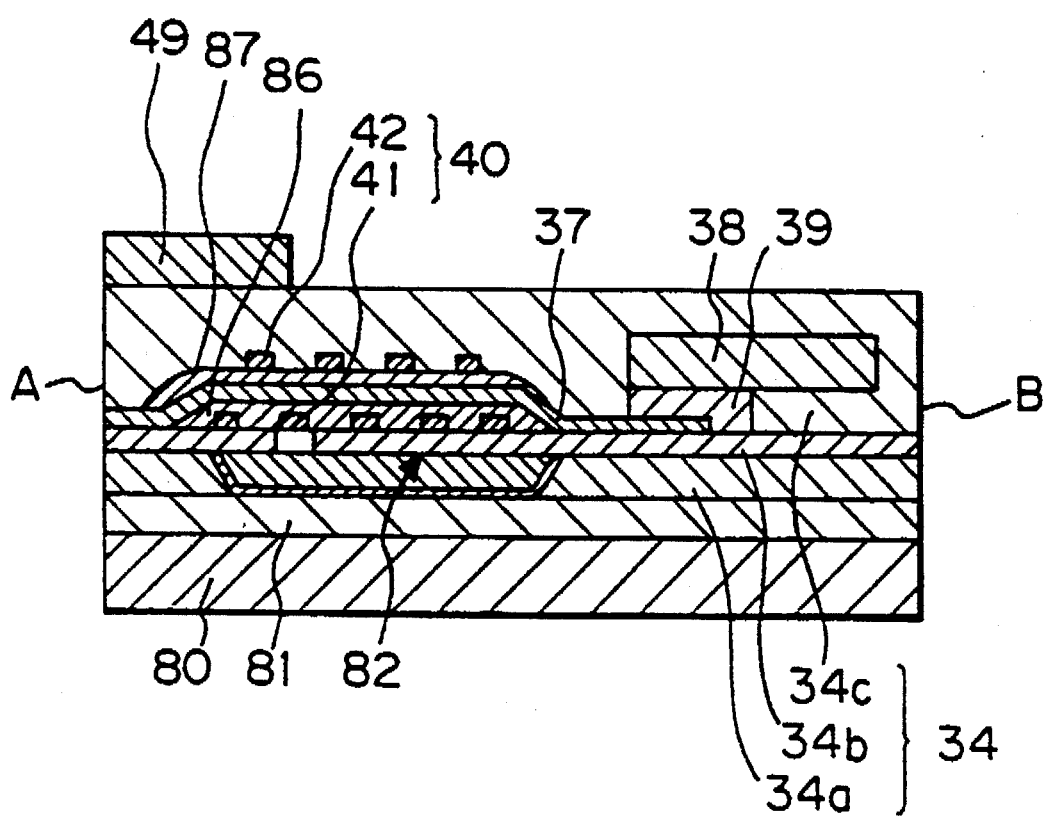

A layer of the return stud 39 is formed on the end of the core 37, and a layer of the return yoke 38 is formed on the return stud 39, as shown in FIG. 9F, and a third base portion 34c is then formed on the completed components, as shown in FIG. 9G. A layer of the contact pad 49 of a wear-resistant material such as diamond like carbon (DLC) is then formed on the third base portion 34c.

Figure 10:
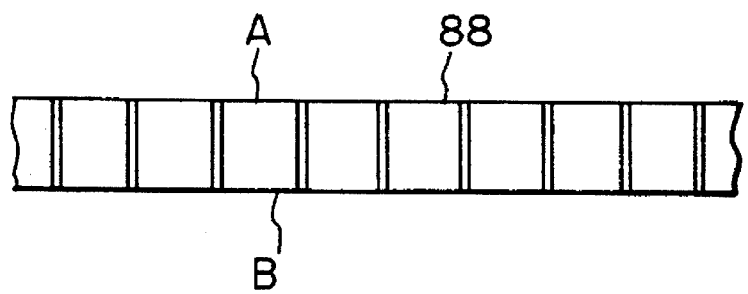
FIG. 10 is a plan view of one of the blocks separated from the block of FIG. 11.
Figure 11:
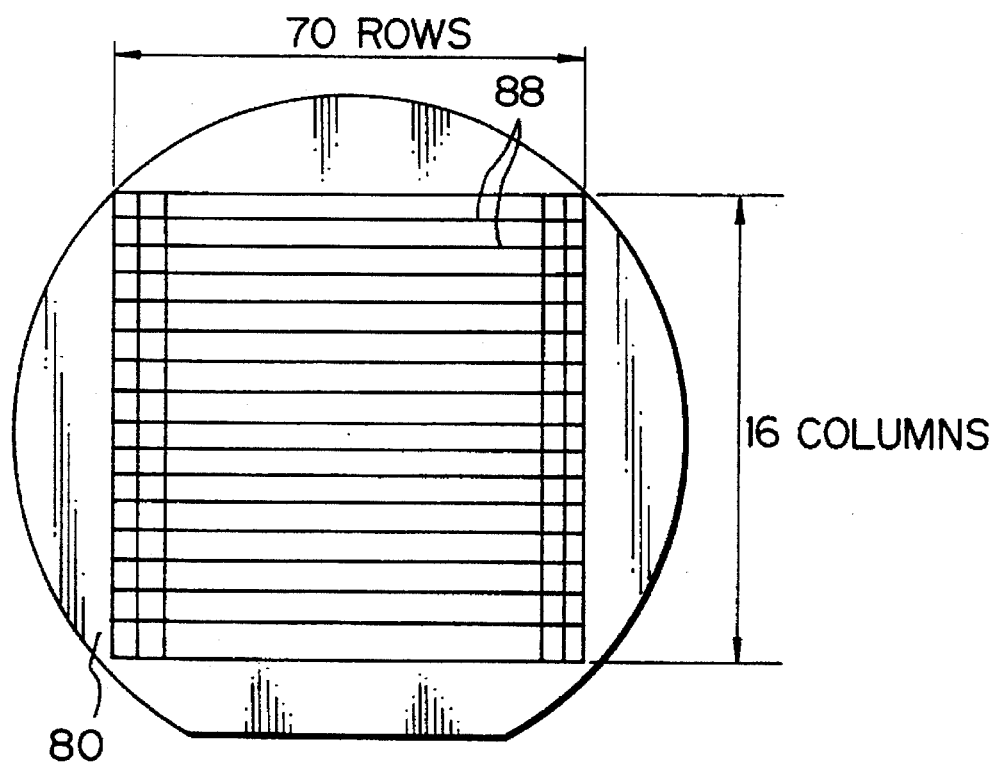
FIG. 11 is a plan view of the substrate and the layout of the magnetic heads on the substrate.

FIG. 11 shows the wafer 80 for forming the magnetic heads 31. It is possible to lay out 1,120 magnetic heads (70 rows×16 columns) on the wafer 80 having a diameter of 3 inches, while 280 magnetic heads (70 rows×4 columns) can be obtained from the same wafer in the conventional design, as described above. The wafer 80 is then separated into elongated blocks 88 along separating planes extending parallel to the rows, after the step of FIG. 9H. FIG. 10 shows one of the separated blocks 88, which has separation planes A and B. FIG. 9I corresponds to the block 88 of FIG. 10, in which separation planes A and B are shown.

Figure 12A:
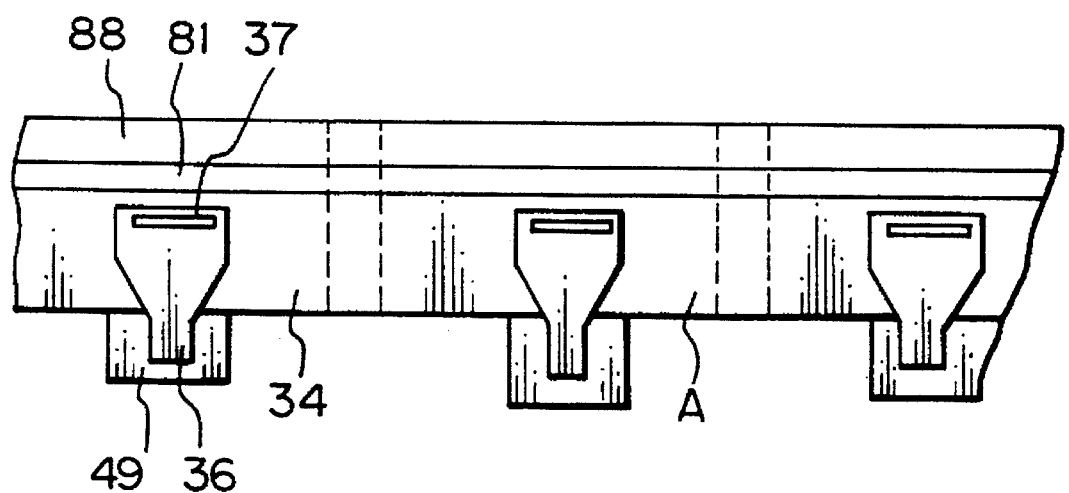
FIGS. 12A and 12B are views illustrating fabrication steps for fabricating the magnetic head, after the step of FIG. 9I.
Figure 12B:
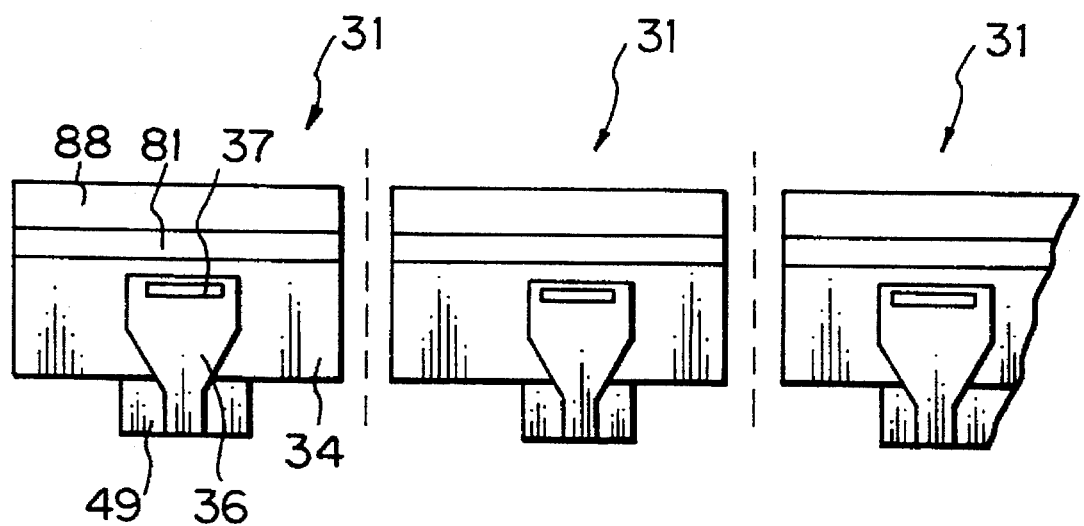

FIGS. 12A and 12B shows the steps after the step of FIG. 9I. A layer of the pole 36 is formed on the plane A of the block 88, as shown in FIG. 12A. A layer of the main yoke 47 is formed on the pole 36 and a protection layer 48 is formed on the main yoke 47, the pole 36, and the plane A of the block 88, although the main yoke 47 and the protection layer 48 are omitted in FIGS. 12A and 12B. The blocks 88 includes a plurality of magnetic heads 31 corresponding to the row of the matrix. The block 88 is then separated into the individual magnetic heads 31, as shown in FIG. 12B. The bottom surface of the contact pad 49 is then polished to set the length of the pole 36 to a predetermined value. The releasing layer 81 and the wafer 80 are then removed from the magnetic head 31 by etching the releasing layer 81.

Figure 13A:
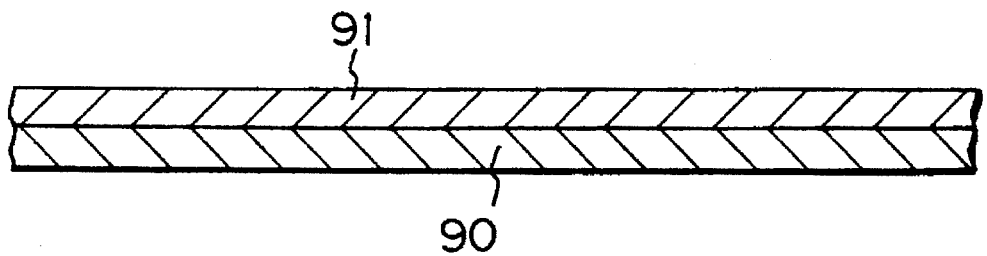
FIGS. 13A to 13E are views illustrating fabrication steps for fabricating the flexible support member of FIGS. 1, 2, 5 and 6.
Figure 13B:
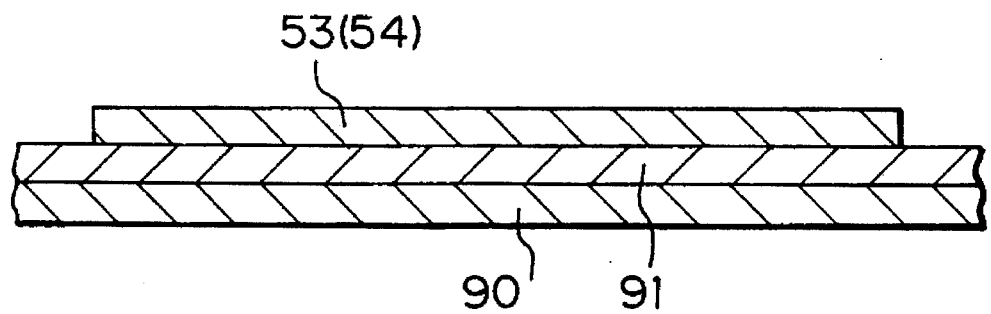
Figure 13C:
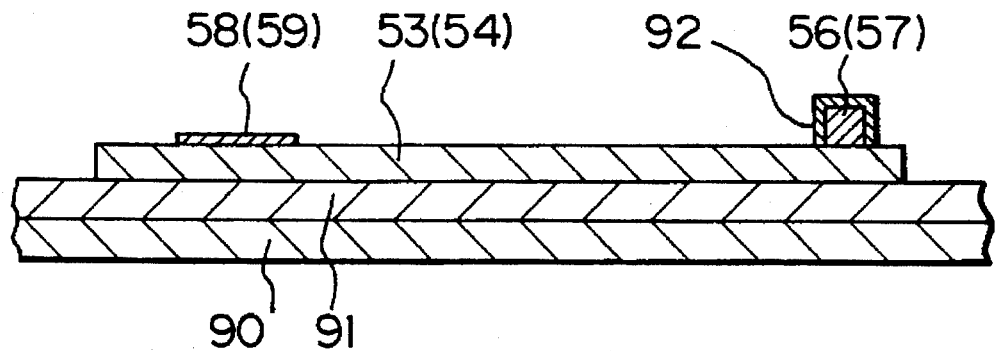
Figure 13D:
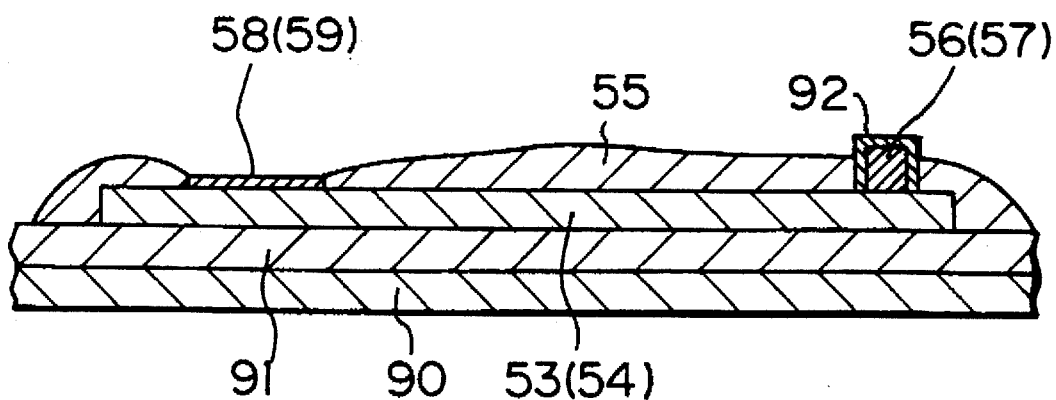
Figure 13E:
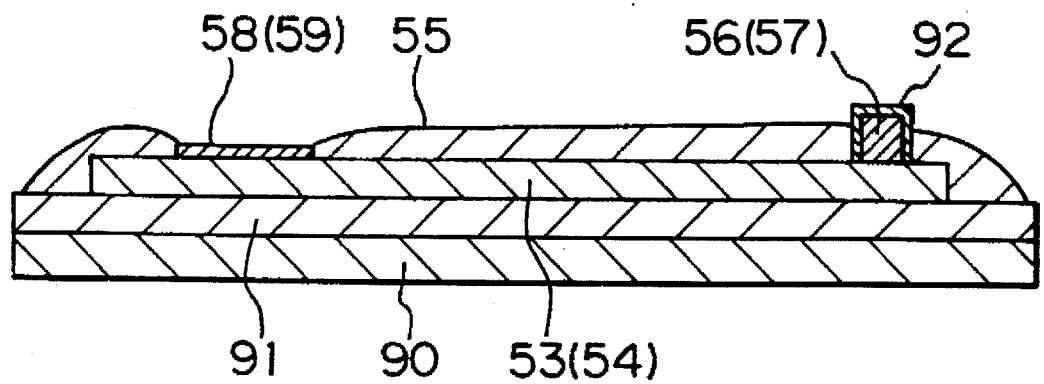

FIGS. 13A to 13E show the fabrication steps of the flexible support member 50 of FIGS. 5 and 6. As shown in FIG. 13A, an insulating layer 91 of alumina or polyimide is formed on a plate 90 of stainless steel. A layer of the conductor patterns 53 and 54 is then formed on the insulating layer 91, as shown in FIG. 13B. A gold layer for the bonding pads 58 and 59 is formed on one end of each of the conductor patterns 53 and 54, and a layer of the bumps 56 and 57 of copper is formed on the other end of each of the conductor patterns 53 and 54, as shown in FIG. 13C. The bumps 56 and 57 are then covered by a gold layer 92. A polyimide protection layer 55 is then formed on the conductor patterns 53 and 54 and the insulating layer 91, as shown in FIG. 13D. The outer profile of the protection layer 55 is then shaped into a predetermined configuration, as shown in FIG. 13E.

The magnetic head 31 fabricated according the steps of 9A to 12B is then attached to the flexible support member 50 fabricated according the steps of 13A to 13E, with the bumps 56 and 57 in abutment with the bonding pads 44 and 46 and with the adhesive 60 filled in a gap between the facing top and bottom surfaces of the flexible support member 50 and the magnetic head 31. Accordingly, it is possible to obtain 1,120 magnetic heads (70 rows×16 columns) from the wafer 80 having a diameter of 3 inches, while only 280 magnetic heads (70 rows×4 columns) can be obtained from the same wafer in the conventional design above. It is thus possible to reduce the cost for fabricating the magnetic head assemblies since the total cost of the cost for fabricating the magnetic head 31 plus the cost for fabricating the flexible support member 50 plus the cost for assembling the magnetic head 31 to the flexible support member 50 is lower than the cost for fabricating the conventional magnetic head having the flexible support arm portion unitary formed with the magnetic head.

Figure 14:
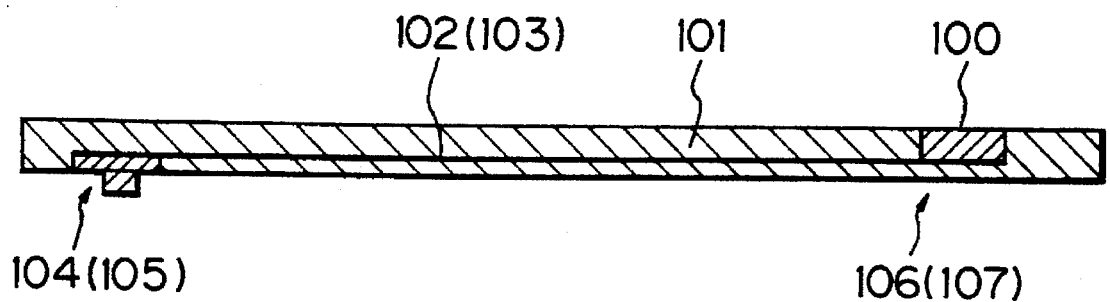
FIG. 14 is a cross-sectional view of the flexible support member according to the second embodiment of the present invention.

FIG. 14 shows the flexible support member 100 according to the second embodiment of the present invention. The flexible support member 100 comprises a base portion 101, and first and second conductor patterns 102 and 103 formed in the base portion 101. First and second bumps 104 and 105 are formed on one end of each of the conductor patterns 102 and 103, projecting from one of the surfaces of the flexible support member 100, for connection to the bonding pads 44 and 46 of the magnetic heads 31 of FIGS. 3 and 4, for example. First and second bonding pads 106 and 107 are formed on the other end of each of the conductor patterns 102 and 103, projecting from the other surface of the flexible support member 100, for connection to a flexible printed wiring board (not shown) carried by the actuator arm 33.

Figure 15A:
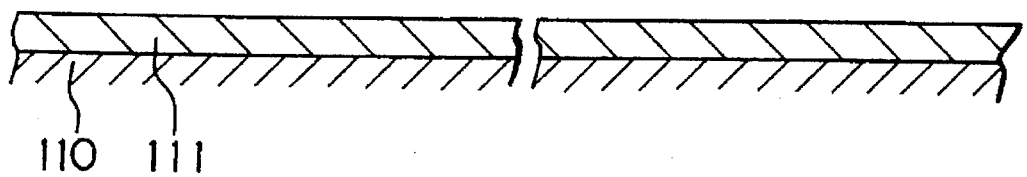
FIGS. 15A to 15G are views illustrating fabrication steps for fabricating the flexible support member of FIG. 14.
Figure 15B:
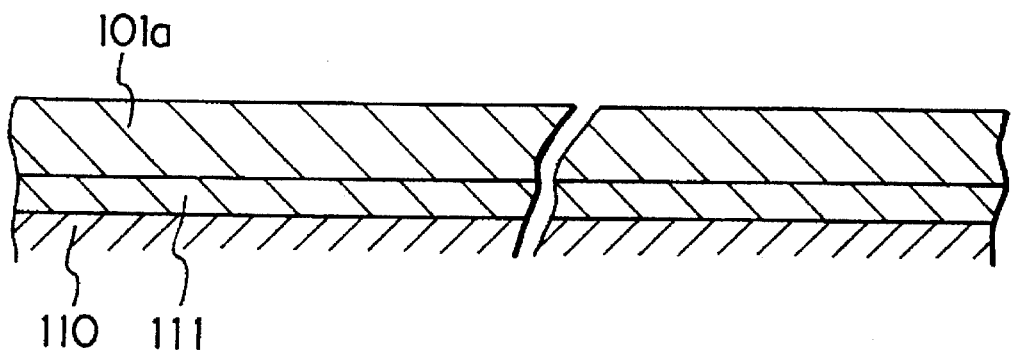
Figure 15C:
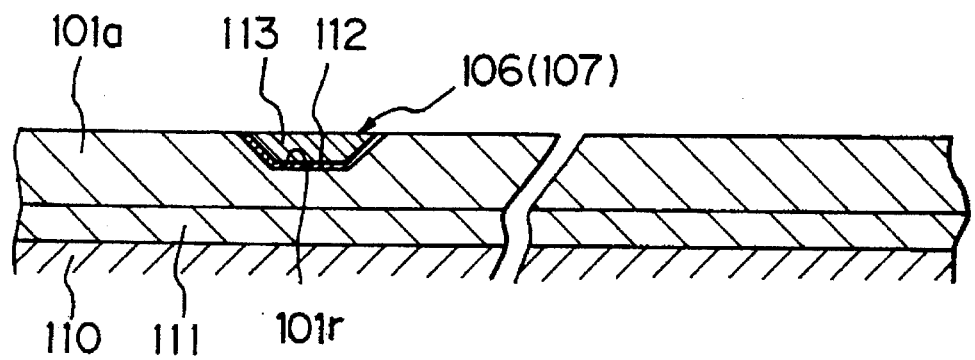
Figure 15D:
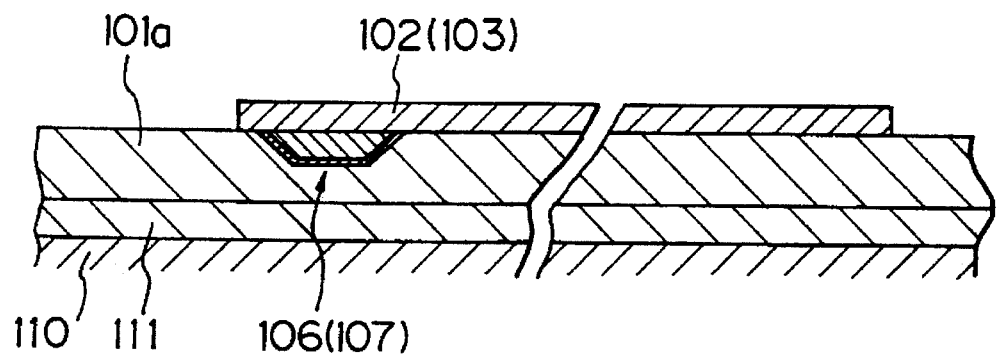
Figure 15E:
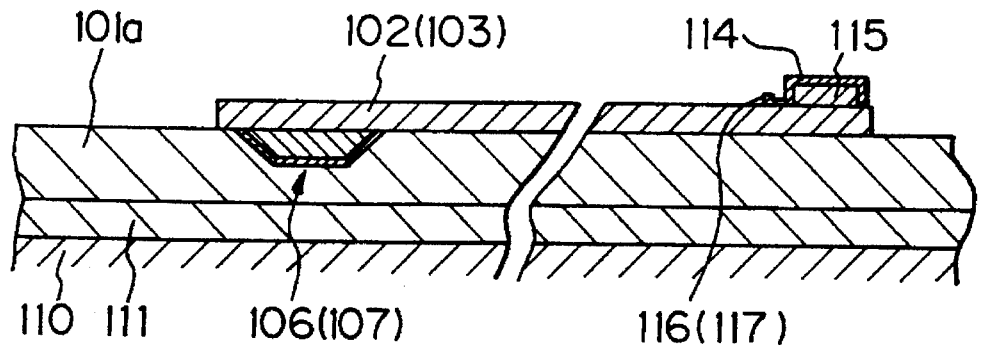

FIGS. 15A to 15G show the fabrication steps of the flexible support member 100 of FIG. 14. As shown in FIG. 15A, a releasing layer 111 of copper is formed on a wafer 110, as shown in FIG. 15A, and a first base portion 101a of alumina is formed on the releasing layer 111, as shown in FIG. 15B. Recesses 101r (only one is shown in the drawings) are then formed in the first base portion 101a and bonding pads 106 and 107 are formed in the recesses 101r, as shown in FIG. 15C. The bonding pad 106 or 107 comprises a bottom layer 112 of gold and a flat layer 113 of copper. First and second conductor patterns 102 and 103 are then formed on the first base portion 101a by a thin-film forming technique in a vacuum environment, so that one end of each of the conductor patterns 102 and 103 cover one of the bonding pads 102 and 103, as shown in FIG. 15D. First and second foot portions 116 and 117 of the bumps are then formed on the other ends of the conductor patterns 102 and 103 by a thin-film forming technique in a vacuum environment, so that the foot portions 116 and 117 project from the conductor patterns 102 and 103 on the opposite side of the bonding pads 102 and 103, as shown in FIG. 15E. The foot portions 116 and 117 comprise a bottom layer 115 of copper and a surface layer 114 of gold.

Figure 15F:
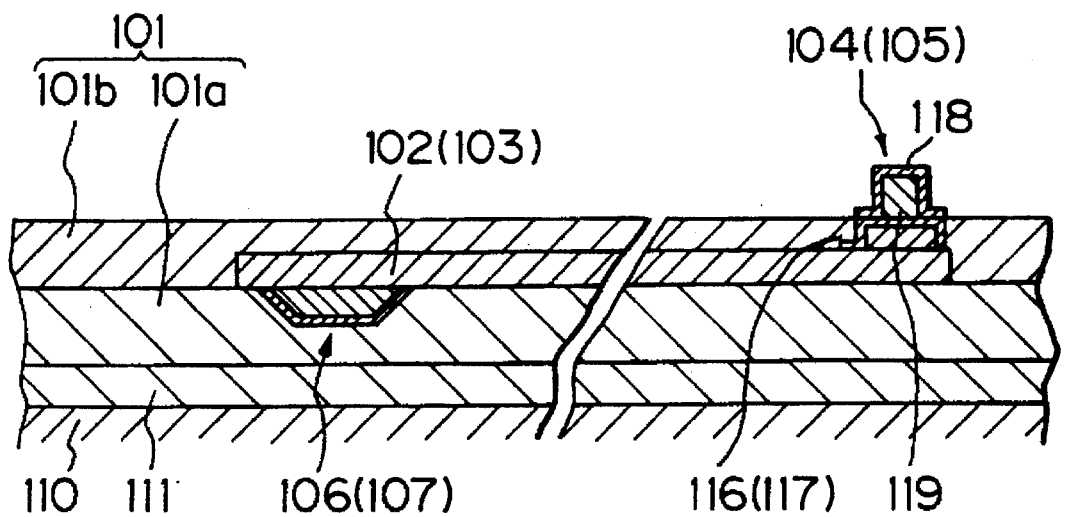
Figure 15G:
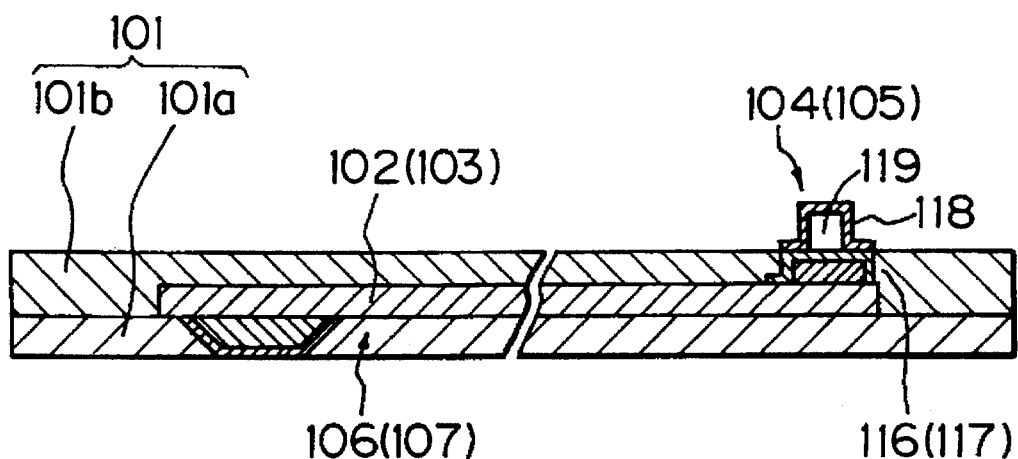

A second base portion 101b is formed on the first base portion 101a so that the surfaces of the foot portions 116 and 117 are not covered by the second base portion 101b, and a layer for the bumps 104 and 105 is then formed on the foot portions 116 and 117 by a thin-film forming technique in a vacuum environment, as shown in FIG. 15F. The bumps 104 and 105 comprise a bottom layer 119 of copper and a surface layer 118 of gold. The releasing layer 111 and the wafer 110 are then removed from the flexible support body 100 by etching the releasing layer 111, and the outer profile of the flexible support member 100 is then shaped into a predetermined configuration, as shown in FIG. 15G.

Figure 16:
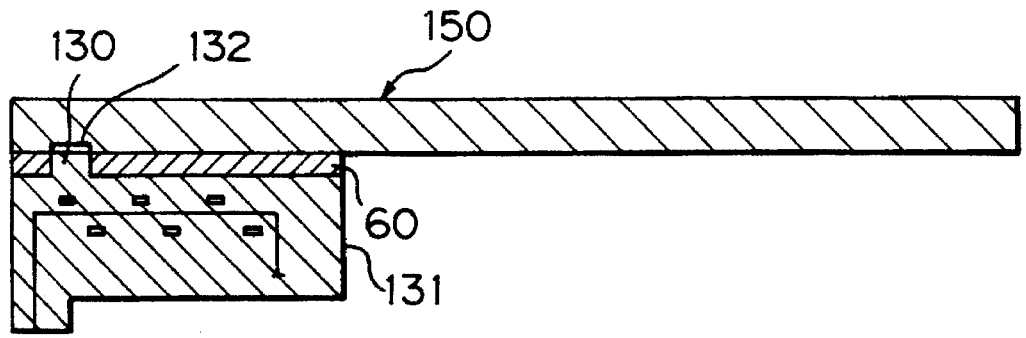
FIG. 16 is a cross-sectional view of the magnetic head assembly according to the third embodiment of the present invention.

FIG. 16 shows a magnetic head assembly according to the third embodiment of the present invention, in which the magnetic head 131 has bumps 130 and the flexible support member 150 has bonding pads 132 for connection to the bumps 130. In addition, the adhesive 60 is inserted in the gap between the magnetic head 131 and the flexible support member 150.

Figure 17A:
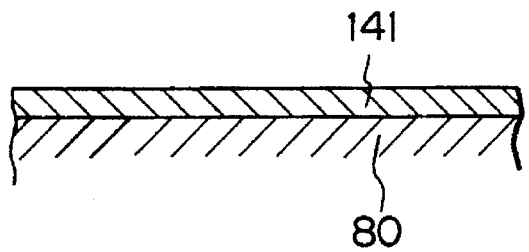
FIGS. 17A to 17F are views illustrating fabrication steps for fabricating the magnetic head of FIG. 16.
Figure 17B:
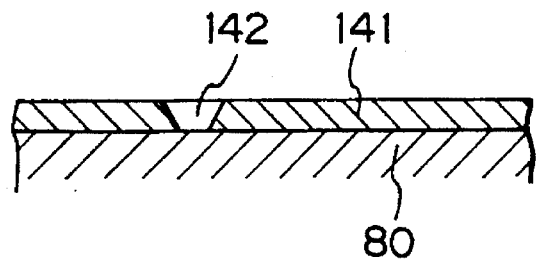
Figure 17C:
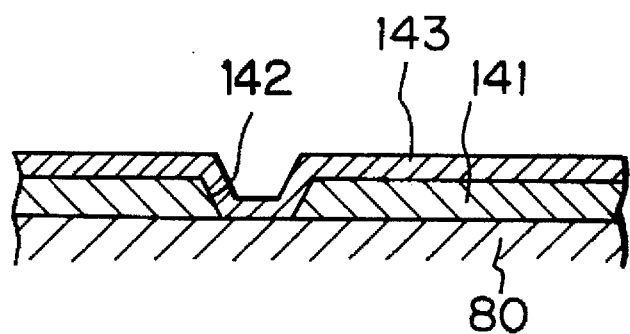
Figure 17D:
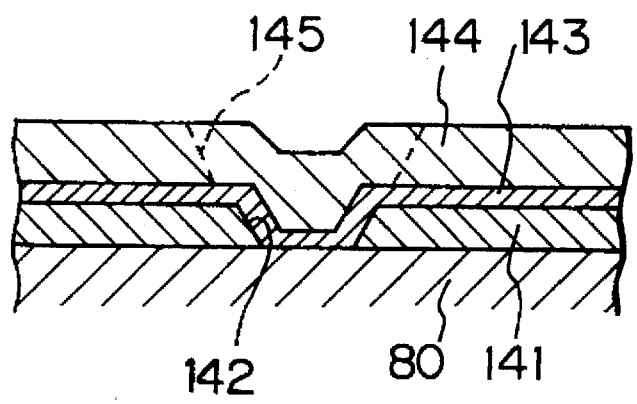
Figure 17E:
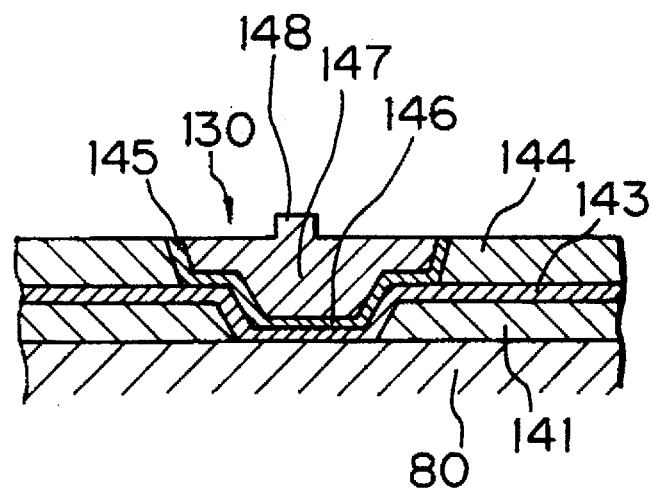
Figure 17F:
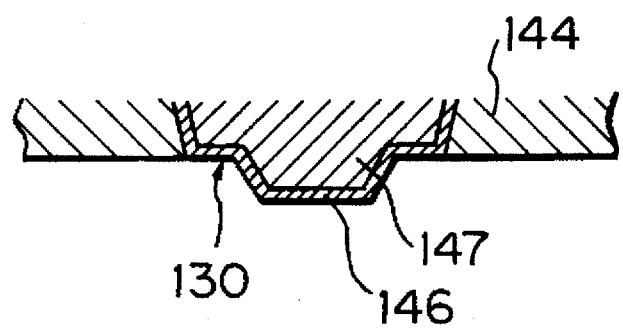

FIGS. 17A to 17F show the fabrication steps for fabricating the magnetic head 131 of FIG. 16. A layer 141 of alumina is formed on a wafer 80 by sputtering, as shown in FIG. 17A, and holes 142 are formed in the layer 141, as shown in FIG. 17B. A releasing layer 143 of copper is then formed on the layer 141 by plating, vapor deposition or sputtering, as shown in FIG. 17C. The releasing layer 143 covers the holes 142 and includes recesses corresponding to the holes 142. A first base portion 144 of alumina is formed on the releasing layer 143, as shown in FIG. 17D. The first base portion 144 also includes recesses corresponding to the holes 142. Further recesses 145 are formed in the first base portion 144 outside of the above described recesses, respectively. A layer for the bumps 130 are then formed in the recess 145, respectively, as shown in FIG. 17E. Similar to the bonding pad of FIG. 12C, each of the bumps 130 comprises a bottom layer 146 of gold, a flat layer 147 of copper, and a stud-like projecting portion 148 of copper. The bottom layer 146 contacts the recessed portion of the releasing layer 143 and projects from the bottom surface of the first base portion 144 when the releasing layer 143 is removed by etching, as shown in FIG. 17F.

The coil, the core, and the pole of the magnetic head 131 are then formed in a manner previously described with reference to FIGS. 9E to 12B. The stud-like projecting portions 148 of the bumps 130 are connected to the ends of the coil.

Figure 18:
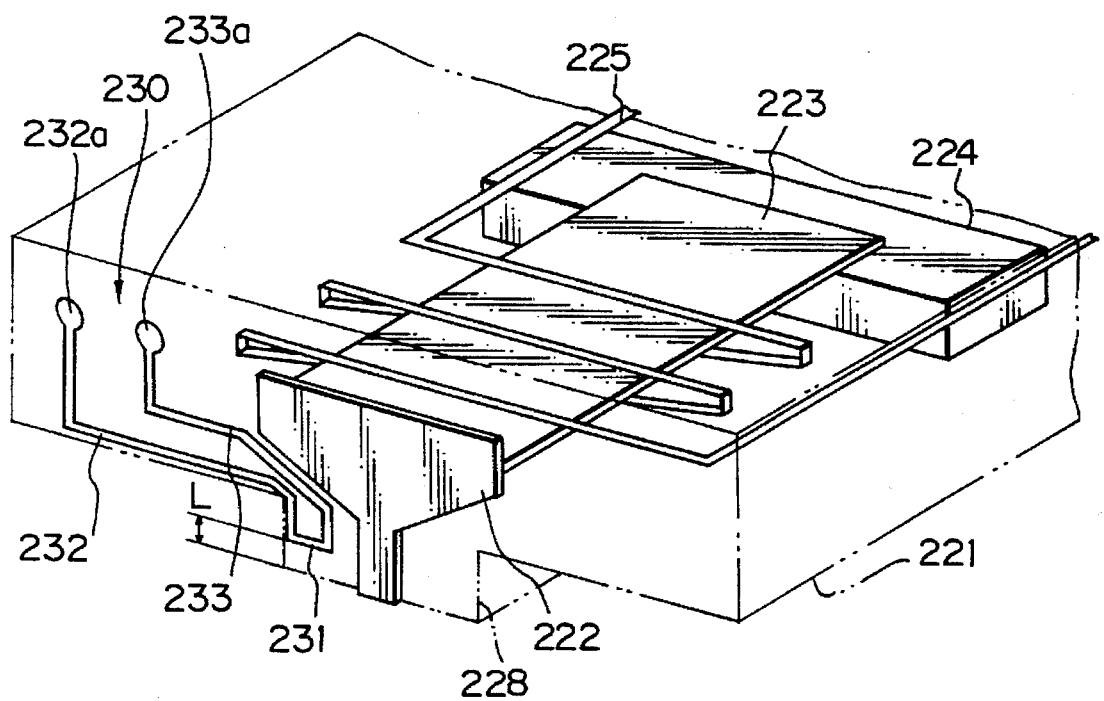
FIG. 18 is a perspective view of the magnetic head according to the fourth embodiment of the present invention.

FIG. 18 schematically shows the magnetic head according to the fourth embodiment of the present invention. The magnetic head comprises a base portion 21, a pole 222, a core 223, a return yoke 224, a coil 225, and a contact pad 228. The feature and function of these elements are similar to those of the previous embodiments.

In FIG. 18, a conductive monitor pattern 230 is arranged on the side surface of the contact pad 228 for monitoring the wear of the pole 222. The monitor pattern 230 comprises a monitoring pattern portion 231 arranged at a predetermined distance L (for example, 3 µm) from the bottom surface of the contact pad 228 and connecting wiring portions 232 for connection of the monitoring pattern portion 231 to a detecting means. The connecting wiring portions 232 have bonding pads 232a on the side surface of the base portion 221. The monitor pattern 230 can be formed simultaneously with the pole 222 on the side surfaces of the base portion 221 and the contact pad 228.

Figure 19:
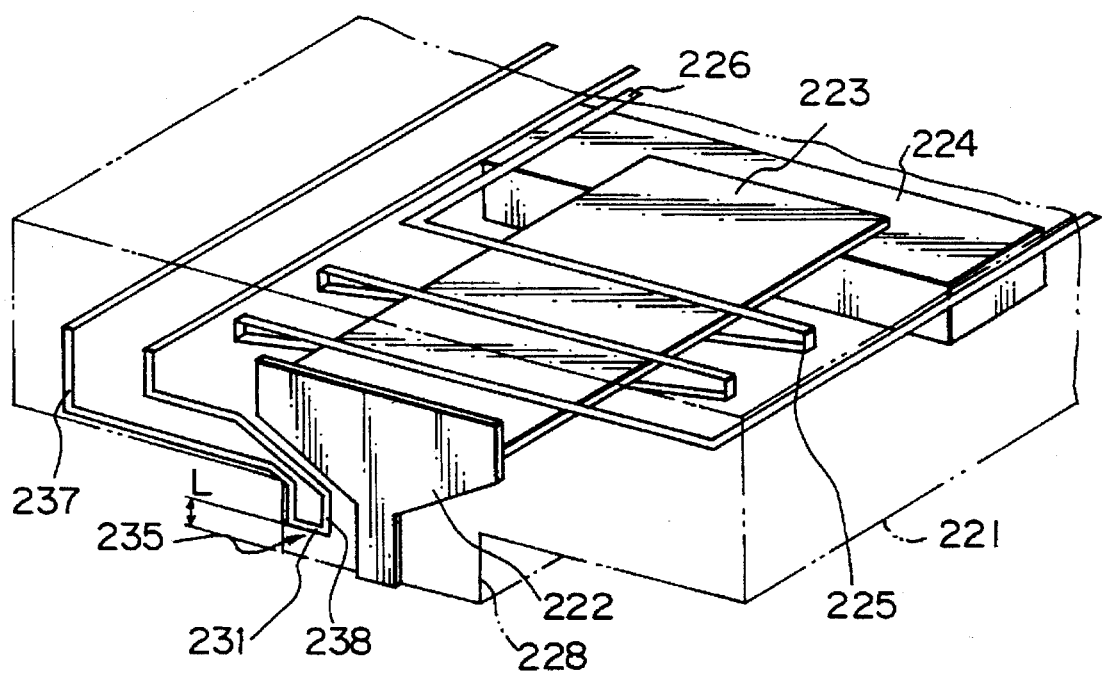
FIG. 19 is a perspective view of the modified magnetic head.

In the modified embodiment of FIG. 19, the monitor pattern 235 comprises a monitoring pattern portion 231 and connecting wiring portions 237 which are extended from the side surface to the top surface of the base portion 221.

Figure 20:
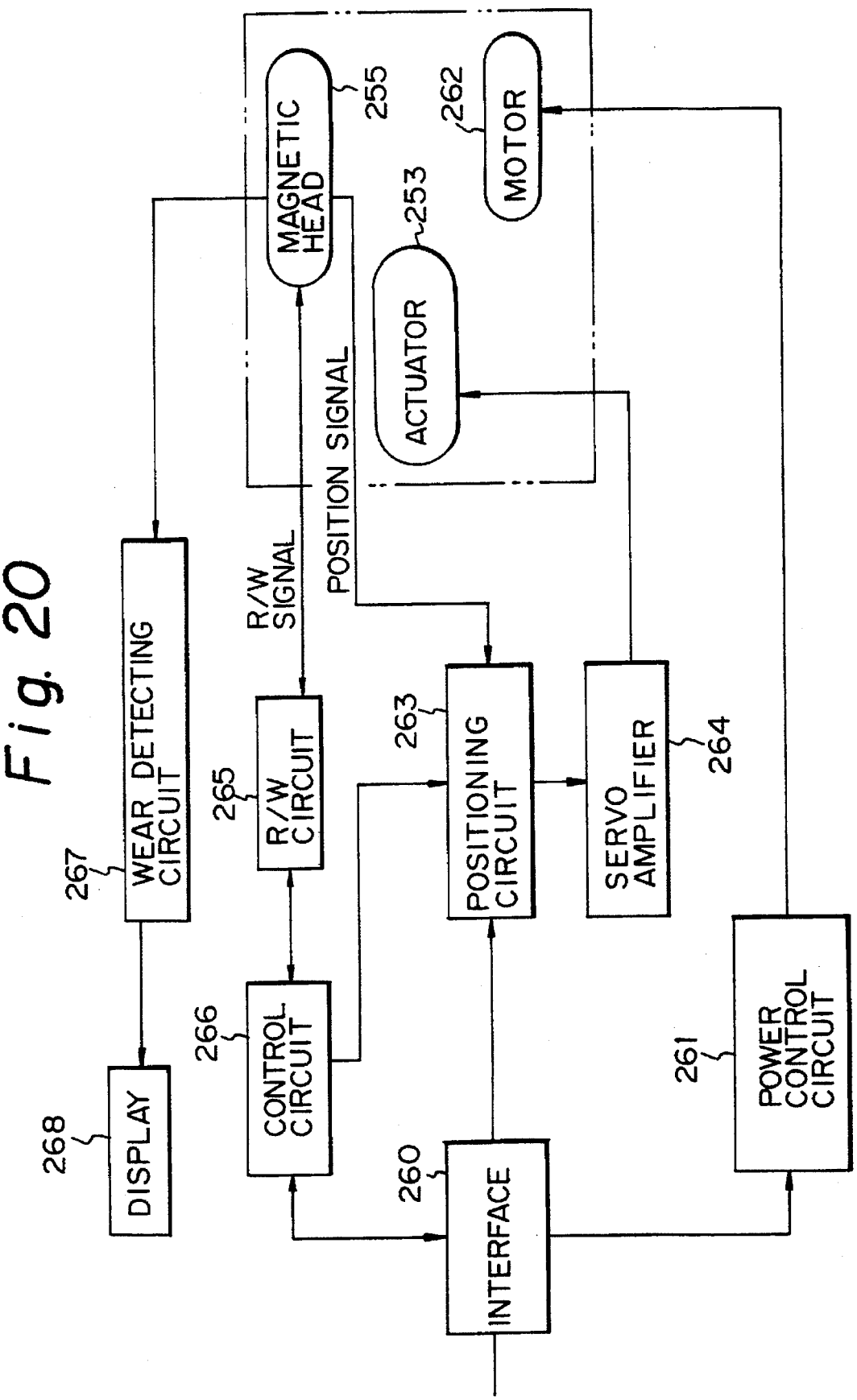
FIG. 20 is a block diagram illustrating electrical components of a magnetic disk apparatus using the magnetic head of FIG. 18.

FIG. 20 is a block diagram illustrating electrical components of a magnetic disk apparatus using the magnetic head of FIG. 18. There is an interface 260 for inputting and outputting data from a main computer (not shown) to the magnetic disk apparatus or from the magnetic disk apparatus to the main computer. A power control circuit 261 controls the spindle motor 262 for driving the magnetic disks 73 (FIG. 8), and a positioning circuit 263 controls a servo amplifier 264 which controls the actuator 253 for driving the actuator arms 33, in response to the command output from the main computer via the interface 260 and the servo data (positional data) of the magnetic disks 72 read by the magnetic heads 255. A read/write (R/W) circuit 265 receives the reading signals from the magnetic head 255 and delivers the writing signals to the magnetic head 255. A control circuit 266 controls positioning circuit 263 and the R/W circuit 265.

A wear detecting circuit 267 receives the wear monitoring signal from the monitor pattern 230 via the connecting wiring portions 232 for detecting the wear of the pole 222 to detect the effective life of the magnetic head 255. A display 268 indicates that the effective life of the magnetic head 255 ends when the breakage of the monitor pattern 230 is detected.

Figure 21:
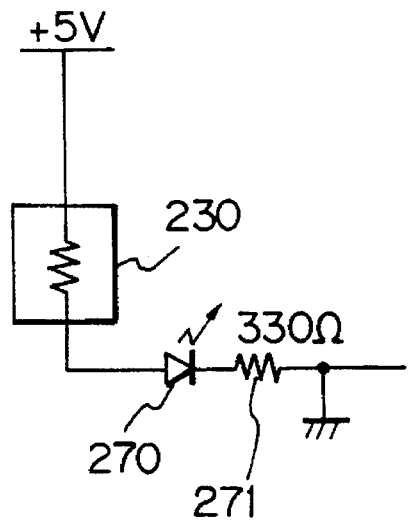
FIG. 21 is a view illustrating an electric circuit for detecting the wear of the pole.
Figure 23A:
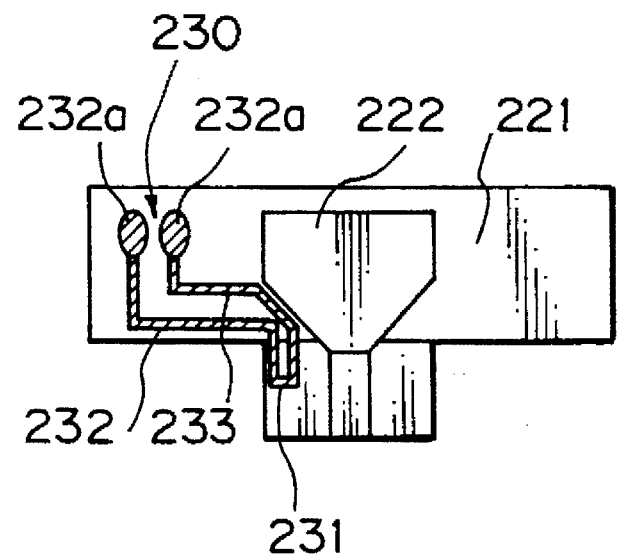
FIGS. 23A and 23B are views illustrating the operation of the monitoring pattern of FIG. 18 for detecting wear of the pole.
Figure 23B:
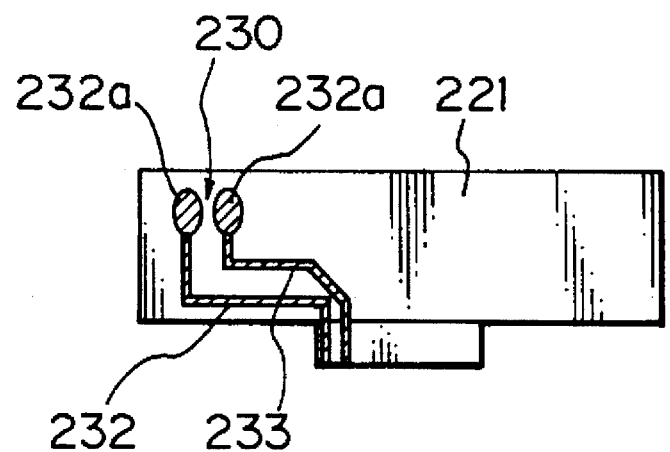

FIG. 21 shows the first example of the wear detecting circuit 267 of FIG. 20. The monitor pattern 230 is represented by a resistor and the display 268 includes a light emitting diode 270, the monitor pattern 230 being connected in series with the light emitting diode 270 and a resistor 271. In this arrangement, the light emitting diode 270 normally emits light before the effective life of the magnetic head 255 ends, and the light emitting diode 270 does not emit light when the monitoring pattern portion 231 of the monitor pattern 230 is broken due to the wear thereof; i.e., when the magnetic head 255 is brought from the condition of FIG. 23A to the condition of FIG. 23B.

Figure 22:
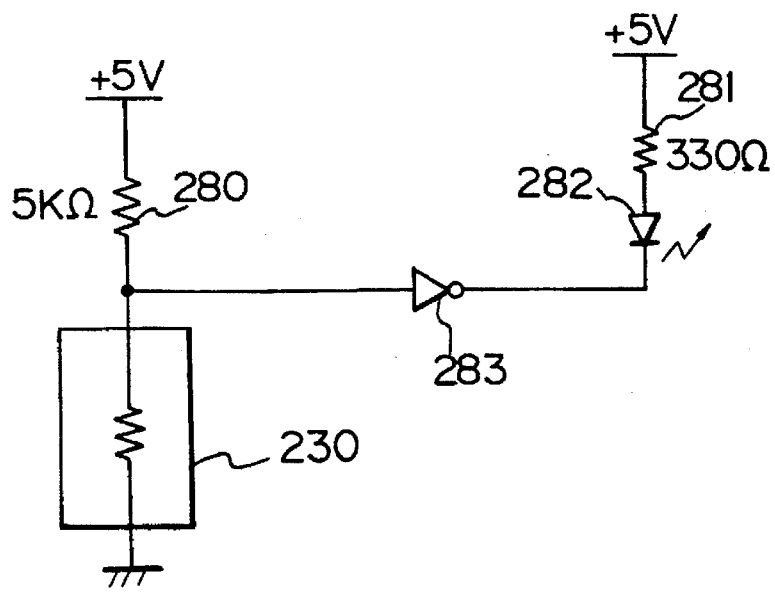
FIG. 22 is a view illustrating another example of an electric circuit for detecting the wear of the pole.

FIG. 22 shows the second example of the wear detecting circuit 267 of FIG. 20. The monitor pattern 230 is represented by a resistor and the display 268 includes a light emitting diode 282. A first resistor 280 having a high resistance (5K $\Omega$) is arranged parallel with a circuit including an inverter 283, the light emitting diode 282, and a second resistor 281 having a low resistance (330 $\Omega$). The monitor pattern 230 is connected from ground to the junction of the resistor 280 and the inverter 283. In this arrangement, the light emitting diode 270 does not emit light before the effective life of the magnetic head 255 ends, since the voltage of the inverter 283 on the side of the first resistor 280 (the input of the inverter 283) is 0 volts and the voltage of the inverter 283 on the side of the second resistor 281 (the output of the inverter 283) is 5 volts and the current does not flow through the light emitting diode 270. The light emitting diode 270 emits light when the monitoring pattern portion 231 of the monitor pattern 230 is broken due to the wear thereof; i.e., when the magnetic head 255 is brought from the condition of FIG. 23A to the condition of FIG. 23B, since the voltage of the inverter 283 on the side of the first resistor 280 is 5 volts and the voltage of the inverter 283 on the side of the second resistor 281 is 0 volts and the current flows through the light emitting diode 270.

As described above, it is possible to reduce the fabrication cost of the contact type thin-film magnetic heads and to detect the allowable wear of the pole of the magnetic head.

I claim:

1. A magnetic head assembly comprising:
    a thin film magnetic head including,
        a base portion having a top surface,
        a coil arranged within said base portion, said coil having first and second ends,
        a pole magnetically coupled with said coil and adapted to contact a recording medium, and
        conductor means connected to said first and second ends of said coil, said conductor means having a pair of head conductor members arranged on said top surface of said base portion, said magnetic head having a size corresponding substantially to said coil and pole; and
    an elongated support member adhesively bonded, at a bottom surface thereof, to said top surface of base portion, said elongated support member having, conductor means extending substantially along the length of said elongated support member, said conductor means having a pair of support conductor members arranged on said bottom surface of said elongated support member;
    wherein one pair of said head or support conductor members are bumps and the other pair are bonding pads, said magnetic head being adhesively bonded with said top surface of said base portion facing said bottom surface of said support member and said bumps in abutment with said bonding pads, an adhesive being filled in a gap between the facing top and bottom surfaces.

2. A magnetic head assembly according to claim 1, wherein each of said bonding pads is arranged in a recess in the top surface of the base portion said bonding pads being flush with the top surface of the base portion.

3. A magnetic head assembly according to claim 2, wherein each of said bonding pads comprises a flat conductor portion and a stud-like conductor portion integral with said flat conductor portion, said stud-like conductor portion extending within one of said base portion and said support member on which said bonding pads are arranged.

4. A magnetic head assembly according to claim 1, wherein each of said bonding pads comprises a flat conductor portion and a stud-like conductor portion formed integrally with said flat conductor portion.

5. A magnetic head assembly according to claim 1, wherein said support member has said bumps and said magnetic head has said bonding pads, and wherein each of said bonding pads comprises a flat conductor portion and a stud-like conductor portion formed integrally with said flat conductor portion, said stud-like conductor portion being connected to one of said first and second ends of said coil.

6. A magnetic head assembly according to claim 1, wherein said magnetic head has said bumps and said support member has said bonding pads.

7. A magnetic head assembly according to claim 1, wherein said support member comprises an elongated base layer, an elongated insulating layer formed on the elongated base layer, elongated conductor patterns along said conductor means, one pair of said bumps and bonding pads connected to one end of each of said conductor patterns, further bonding pads connected to the other end of each of said conductor patterns, and a protective layer formed on said conductor patterns with said one pair of said bumps and bonding pads and said further bonding pads being revealed by said protective layer.

8. A magnetic head assembly according to claim 7, wherein said layers of said support member comprise materials which can be formed into a film in a vacuum environment.

9. A magnetic head assembly according to claim 1, wherein said base portion of said magnetic head includes a bottom surface and a contact pad arranged on said bottom surface, said contact pad having a bottom surface adapted to contact a recording medium and a side surface extending flush with said side surface of said base portion, said pole extending from said side surface of said base portion to said side surface of said contact pad.

10. A magnetic head assembly according to claim 9, wherein a conductive monitoring pattern is arranged on said side surface of said contact pad for monitoring the wear of said pole.

11. A magnetic head assembly according to claim 10, wherein said monitoring pattern comprises a monitoring pattern portion arranged at a predetermined distance from said bottom surface of said contact pad and connecting wiring portions for connection of said monitoring pattern portion to a detecting means for detecting wear of said pole, said detecting means being connected to a display means for displaying wear information.

12. A magnetic head assembly according to claim 11, wherein the breakage of said monitoring pattern portion is detected by said detecting means.

13. A magnetic head assembly according to claim 1, wherein said base portion of said magnetic head has a core arranged within said base portion, said core having first and second ends, said pole being connected to said first end of said core, said coil being arranged around said core.

14. A magnetic head assembly according to claim 13, wherein said core extends generally parallel to said top surface of said base portion.

15. A magnetic head assembly according to claim 13, wherein said base portion of said magnetic head has a return yoke connected to said second end of said core.

16. A magnetic head assembly according to claim 13, wherein said coil is arranged helically around said core.

17. A magnetic head assembly according to claim 1, wherein said base portion of said magnetic head has a side surface perpendicular to said top surface of said base portion and a bottom surface, and said pole is arranged on said side surface of the base portion toward said bottom surface.

18. A thin-film magnetic head assembly according to claim 1:

said base portion having a second surface perpendicular to said top surface;

said base portion including a core extending generally parallel to said top surface of said base portion within said base portion;

said coil being arranged helically around said core within said base portion;

said pole being arranged on said second surface of said base portion, and said pole having a first end connected to said core and a second end adapted to contact a recording medium;

said base portion further including a return yoke connected to said core; and wherein said head conductor member comprises, a pair of exposed bonding pads arranged on said top surface of said base portion, each of said bonding pads comprising a flat conductor portion arranged on said first surface to correspond to bonding pads of said elongated head member, and a stud-like conductor portion formed integrally with said flat conductor portion within said base portion, said stud-like conductor portions being connected to said first and second ends of said coil.

19. A magnetic head assembly comprising:

a thin film magnetic head including, a base portion having a top surface, a coil arranged within said base portion, said coil having first and second ends, a pole magnetically coupled with said coil and adapted to contact a recording mediums, and conductor means connected to said first and second ends of said coil, said conductor means having a pair of head conductor members arranged on said top surface of said base portion; and an elongated support member adhesively bonded, at a bottom surface thereof, to said top surface of said base portion, said elongated support member having conductor means extending substantially along the length of said support member, said conductor means having a pair of support conductor members arranged on said bottom surface of said support member;

wherein one pair of said head or support conductor members are bumps and the other pair are bonding pads, said magnetic head being adhesively bonded to said support member with said top surface of said base portion facing said bottom surface of said support member and said bumps in abutment with said bonding pads, an adhesive being filled in a gap between the facing top and bottom surfaces, and wherein said base portion of said magnetic head includes a bottom surface, a side surface and a contact pad arranged on said bottom surface, said contact pad having a bottom surface adapted to contact a recording medium and a side surface extending flush with said side surface of said base portion, said pole extending from said side surface of said base portion to said side surface of said contact pad.

20. A magnetic head assembly according to claim 19, wherein a conductive monitor pattern is arranged on said side surface of said contact pad for monitoring the wear of said pole.

21. A magnetic head assembly according to claim 20, wherein said monitoring pattern comprises a monitoring pattern portion arranged at a predetermined distance from said bottom surface of said contact pad and connecting wiring portions for connection of said monitoring pattern portion to a detecting means for detecting wear of said pole, said detecting means being connected to a display means for displaying wear information.

22. A magnetic head assembly according to claim 21, wherein the breakage of said monitoring pattern portion is detected by said detecting means.

23. A magnetic head assembly comprising:

a thin film magnetic head including, a base portion having a top surface, a core extending longitudinally within said base portion;

a coil having first and second ends, said coil being arranged helically around said core and within said base portion, a pole connected to said core and magnetically coupled to said coil, said pole extending latitudinally to said base portion, and first and second head conductor members respectively connected to said first and second ends of said coil, said first and second head conductor members being arranged on said top surface of said base portion; and an elongated support member adhesively bonded, at a bottom surface thereof, to said top surface of said base portion, said elongated support member substantially covering said top surface of said magnetic head and further extending longitudinally beyond said magnetic head, said elongated support member including first and second support conductor members arranged on said bottom surface, wherein one of said head or support conductor members are bumps and the other are bonding pads, and said bottom surface of said elongated support member is adhesively bonded to said top surface of said base portion of said magnetic head so that electrical contact is established between the head and support conductor members by abutment of the same.

* * * * *